Feb. 4, 1941. R. BLAKELY ET AL 2,230,673
MULTIPLYING AND CHECKING MACHINE
Filed Sept. 25, 1936 8 Sheets-Sheet 1

INVENTORS
Robert Blakely
Arthur T. Dickinson
BY Cooper, Kerr & Dunham
ATTORNEYS

Feb. 4, 1941.  R. BLAKELY ET AL  2,230,673
MULTIPLYING AND CHECKING MACHINE
Filed Sept. 25, 1936  8 Sheets—Sheet 2

INVENTORS
Robert Blakely &
Arthur H. Dickinson
BY
Cooper, Kerr & Dunham
ATTORNEYS Feb. 4, 1941.   R. BLAKELY ET AL   2,230,673
MULTIPLYING AND CHECKING MACHINE
Filed Sept. 25, 1936   8 Sheets-Sheet 4

Feb. 4, 1941.　　　R. BLAKELY ET AL　　　2,230,673
MULTIPLYING AND CHECKING MACHINE
Filed Sept. 25, 1936　　　8 Sheets-Sheet 7

FIG. 7c.

INVENTORS
Robert Blakely &
Arthur W. Dickinson
BY
Cooper, Kerr & Dunham
ATTORNEYS Patented Feb. 4, 1941

2,230,673

UNITED STATES PATENT OFFICE

2,230,673

MULTIPLYING AND CHECKING MACHINE

Robert Blakely, Ridgewood, N. J., and Arthur H. Dickinson, New York, N. Y., assignors to International Business Machines Corporation, New York, N. Y., a corporation of New York Application September 25, 1936, Serial No. 102,470

3 Claims. (Cl. 235—61.7)

This invention relates to improvements in multiplying and checking machines.

According to previous practice with record controlled multiplying machines it was customary to compute a succession of problems pertaining to separate records in a run and record the product of each calculation on the record from which the factors were derived. Then in order to check the calculations and products as recorded, it was the practice to take the set of records and run them through a checking machine wherein the entry relations of the factors were reversed on entry and wherein new computations were performed and the results of each computation checked back against the product amount derived from the record.

Other methods of checking involved group checking wherein re-computations were effected and the sum of a set of products checked against the sum of the previously calculated products.

All of these previous methods of checking involved a supplemental checking run for all records to be checked.

According to the present invention checking is effected for each record as computed. While such a procedure slows up the time for effecting the original calculations, checking calculations and the recording on a set of records, the over-all effect is a saving of time because common card handling and other cycles are used for original calculations and for checking. Generally, the procedure is as follows: The multiplier and multiplicand are read from the record and entered into their respective receiving devices in the usual way. At the same time the multiplier and multiplicand are entered in reverse relations in supplemental multiplier and multiplicand receiving devices. The machine then proceeds with the computation and after computing it will have a product derived from the multiplier and multiplicand as entered in a straight manner and it will also have a comparison product derived from the same factors with their entry relations reversed. The machine then checks one product against the other and if the two amounts agree, the multiplying operation checks and punching from one of the product accumulators is permitted to take place. If the two amounts disagree, punching is suppressed and the incorrectly calculated card can be removed. After this comparison of the calculated product has been made and punching has taken place, one of the product accumulators is reset, but the other one is retained with its product setting upon it. Such product setting is thereafter compared column by column with the product as recorded on the card and if these two product amounts compare, the correct card is ejected. If they do not compare, punching stops and the incorrectly punched card can be removed.

By the foregoing arrangement there is a separate check on the product as calculated and a separate check on the product as recorded and checking is individual for each record and the necessity of removing the cards from the machine and running through on an additional run to check is obviated. While more time is required to get any one result on a card and check as compared with a straight multiplying machine, there is an over-all saving of time over a straight multiplying operation followed by a separate checking operation because certain cycles are common for both checking and regular multiplying and these commonly used cycles afford a shortening of the over-all time of operation.

Another object is to provide means for checking rate card operations which has not heretofore been possible.

Other objects of the present invention reside in the provision of an accounting machine for performing a mathematical problem with means to re-perform the problem and check the accuracy of the computed result as computed and with means to record such result after checking of computing and for then checking the accuracy of recording.

Another object resides in a machine for effecting multiplication and checking during one and an original run of records through the machine.

Another object resides in the provision of a multiplying accounting machine adapted for rate card operations, with means for checking operations.

A further object resides in the provision of a rate card multiplying machine with checking means to check both computing and recording separately and further by and during one run of records through the machine.

Further objects reside in the provision of a multiplying machine adapted for normal multiplying operations and for rate card operations and for checking under either type of operation, checking in either event is individual checking for computing and individual and separate checking for recording.

Further objects reside in novel comparison controls to check before recording and permit some operations to continue even if a disagreement is found whereby time is saved.

Other objects reside in a machine with improved controls to eliminate dummy multiplying cycles, transfer cycles and certain reset cycles under rate card operations.

Other objects reside in the provision of a machine which includes a comparison control which compares column by column as results are recorded and which holds up further recording if a previous column as recorded fails to compare.

Further and other objects of the present invention will be hereinafter set forth in the accompanying specification and claims and shown in the drawings, which show by way of illustration a preferred embodiment and the principle thereof and what we now consider to be the best mode in which we have contemplated applying that principle. Other embodiments of the invention employing the same or equivalent principle may be used and structural changes made as desired by those skilled in the art without departing from the present invention and within the scope of the appended claims.

In the drawings:

Fig. 6 is a sequence of operation timing diagram.

*Machine structure*

Figures 1, 4:
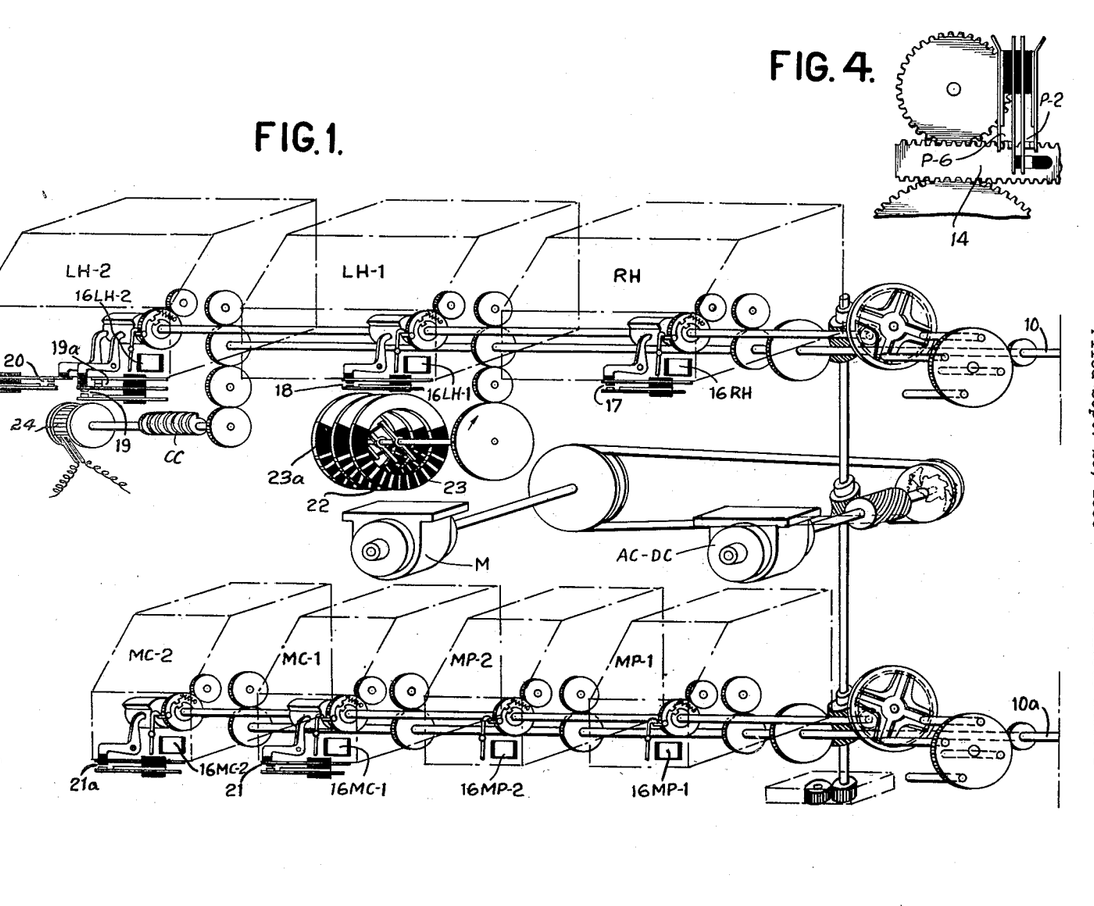
Figures 1 and 1a, taken together, show a somewhat diagrammatic view of the various units of the machine and the driving mechanism therefor.
Fig. 4 is a detail view showing a certain supplemental control contact used in the punching section of the machine.
Figures 1A, 2:
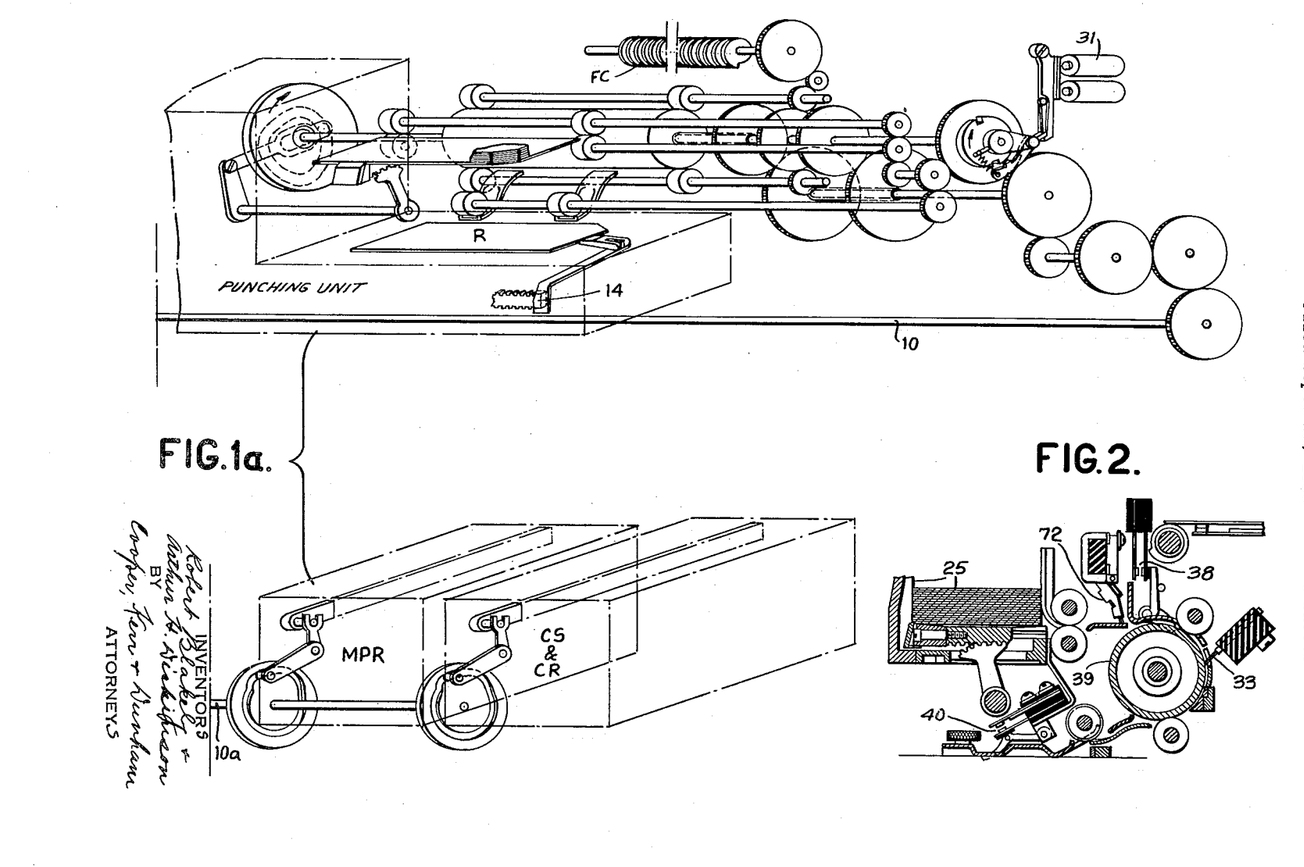
Fig. 2 is a vertical sectional view of the card handling and feeding section of the machine.

The machine so far as its general construction and manner of drive is concerned, is substantially the same as the machine shown in Daly United States Patent No. 2,045,437, June 23, 1936 (see also U. S. patent to Bryce No. 2,045,436). The usual motor M (Fig. 1) with the customary driving connections drives the main upper and lower drive shafts 10 and 10a. An A. C.—D. C. generator marked "AC—DC" is also driven in the customary manner. The machine comprises three accumulators, respectively designated RH, LH—1 and LH—2 which are driven from the upper drive shaft 10 in the usual way. From the lower driven shaft, entry receiving devices MP—1, MP—2, MC—1 and MC—2 are driven in the customary way. The main upper drive shaft 10 also drives the card handling and punching section of the machine which is shown in Fig. 1a. A detail description of this card handling and punching section is unnecssary because it is identical with the disclosure of the above mentioned Daly patent.

A punching unit is also provided so labelled in Fig. 1a. This punching unit or punching mechanism is identical with the punching mechanism or unit shown in the Daly patent with the following exceptions. Just beyond the punching die, (see Fig. 3) there is provided a sensing station comprising a row of contact balls 12 mounted in an insulating support and spring pressed towards the card. Above the card there is a contact block 13. It will be understood that when a perforation passes over the ball 12, the ball is pressed upwardly by its spring and establishes contact with the contact block 13 above it. In the Daly patent (see Fig. 5a) a card feed rack 181 is provided. In the instant machine this card feed rack is shown at 14 in Fig. 4 and Fig. 1a and such card feed rack when in extreme left hand position is adapted to open the usual P—2 contacts and to close new supplemental contacts P—6. When the rack 14 is in other than extreme left hand position it allows the aforesaid contacts to take the position shown in Fig. 4.

The machine also includes the customary MPR and CS and CR electromechanical relay sections, the same being shown on Fig. 1a. These electromechanical relay devices receive their drive from the lower drive shaft 10a in the customary manner. The customary resetting drives are provided for the upper and lower accumulators and/or entry receiving devices. The reset means are the same as that shown in the Daly patent above referred to. There are also the usual reset initiating magnets which will be designated 16RH, 16LH—1, 16LH—2, 16MP—1, 16MP—2, 16MC—1 and 16MC—2. Various reset controlled contacts are also provided, viz. contacts 17, which are normally open and close on RH reset. Contacts 18 are normally open contacts and close on LH—1 reset. Contacts 19 and 20 are normally open contacts and close on LH—2 reset. Contacts 19a open on LH—2 reset. Contacts 21 are normally open contacts and close on MC—1 reset. Contacts 21a are normally open contacts and close on MC—2 reset.

The machine also comprises three emitters 22, 23 and 23a, which are driven in the customary manner from the main upper drive shaft 10. An impulse distributor 24 is driven in the customary manner and a number of CC cams are provided for operating CC cam contacts driven as indicated. There are seven CC contact cams.

Figure 5:
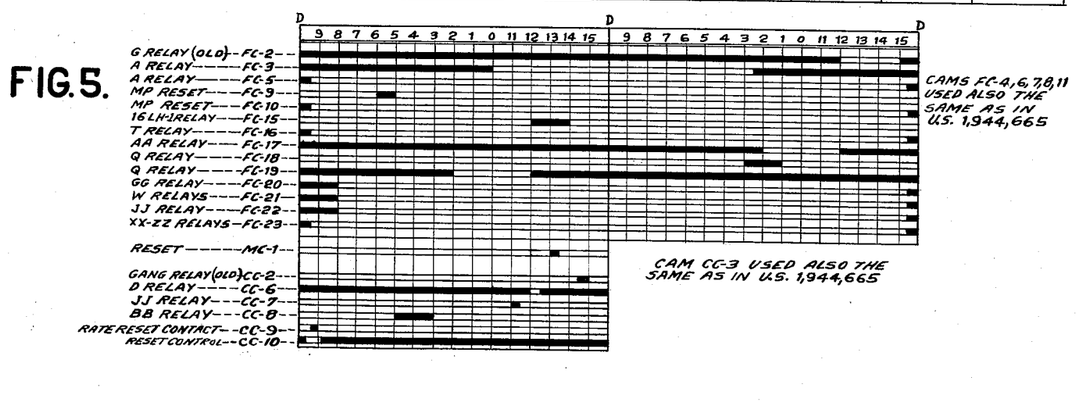
Fig. 5 is a cam contact timing diagram.
Figure 6:
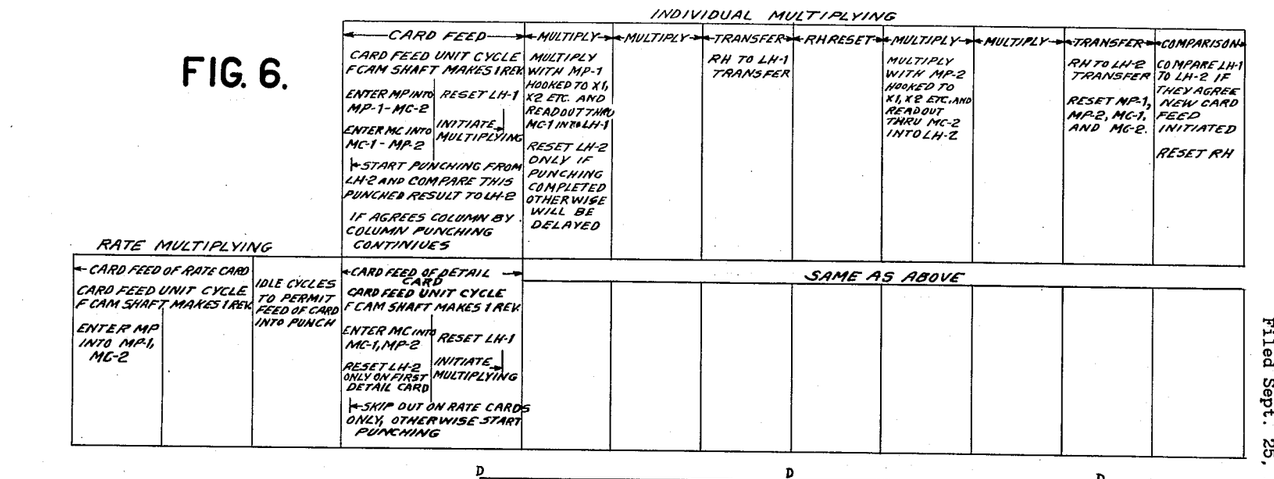
In Fig. 6 the upper diagram represents the sequence of operations for regular multiplying and checking and the lower portion of the diagram indicates the sequence of operations for rate card multiplication and checking.

The card feeding section is also provided with FC cam contacts which are nineteen in number and driven as indicated in Fig. 1a. The timing of cams having novel timing relations is shown on Fig. 5. So far as cams FC—4, FC—6, FC—7, FC—8 and FC—11 are concerned, such cams are timed in the same manner as the correspondingly lettered cams in United States patent to Oldenboom, No. 1,944,665. The FC—2 cam contact is also similarly timed to the corresponding cam of Oldenboom and its timing is also shown in the timing diagram for reference purposes. Cam CC—3 of the CC cam group is timed as per the correspondingly lettered cam in the above mentioned Oldenboom patent and the CC—2 cam is timed in the same way as the corresponding cam in the Oldenboom patent and CC—2 is repeated in the timing diagram for reference purposes.

*General operation of machine*

Before describing the circuit diagram of the machine the general sequence of operations will be traced to give an understanding of the mode of operation prior to tracing the details of operation in connection with the description of the circuit diagram.

A supply of cards properly punched with the multiplier and multiplicand amounts are placed in the card magazine 25 (see Fig. 2). The machine is started up and the multiplier and multiplicand amounts are directly entered into MP—1 and MC—1 respectively. The multiplier amount is likewise entered into MC—2 and the multiplicand amount is entered into MP—2. This is effected by a single entry operation. The machine then proceeds to compute the product of the multiplier and multiplicand in MP—1 and MC—1 and the product thereof is set up in LH—1. After this product is so set up in LH—1, the RH accumulator is reset and thereafter a further series of calculating cycles ensue. In these computing cycles a calculation is made wherein the amount standing in MC—2 is multiplied by the amount standing in MP—2. It will be understood that this calculation is effected in a reverse manner with respect to the previous calculation, that is to say, the amount which was the multiplicand in the previous calculation is now the multiplier and the amount which was previously the multiplier in the previous calculation is now the multiplicand.

The product of these amounts which, of course, is the same product as previously computed, provided the calculation is effected correctly, is entered into LH—2. The machine then goes through a comparing operation and compares the amount in LH—1 with the amount in LH—2. This is effected for each individual card. If the two product amounts compare, signifying that the previous calculation was correctly effected, a new card feed cycle is initiated. Also the LH—1 accumulator is reset. The result standing in LH—2 is punched on the card and it is read column by column to compare the amount as punched with the amount standing in the corresponding order of the LH—2 accumulator and to control punching for the next succeeding order. If these two amounts compare completely, machine operations proceed in the usual way and new cycles on a following card are allowed to proceed. If they do not compare, the punching stops and further multiplying operations are suppressed until the incorrectly recorded card is removed.

*Circuit diagram*

Referring now to the circuit diagram figures, after the cards are placed in the magazine 25 (Fig. 2), the first operation is to close the switch 26 (Fig. 7e) providing current for the main driving motor M. The A. C.-D. C. generator supplies direct current to the D. C. buses 27 and 28. Alternating current impulses are supplied to ground and to bus 29. The start key is now depressed to close the start key contacts 30 (Fig. 7e) and complete a circuit from the 27 side of the line through relay coil C, contacts 30, relay contacts G—1 in the position shown, FC—2 and back to the 28 side of the D. C. line. A stick circuit for C is established through stick contacts C—2 and cam contacts FC—8. Energization of relay coil C closes relay contact C—1 and a circuit is established traced as follows: From the 27 side of the D. C. line, through relay contacts F—1, which are now in the position shown, through card feed clutch magnet 31 (see also Fig. 1a), through cam contacts FC—6 now closed, through stop key contacts 32 now closed, through relay contacts N—1 and C—1 now closed, through the punch controlled contacts P—1 now closed and back to the other side of the line. The punch contacts P—1 are operated in a similar manner to similarly numbered contacts in the Daly patent above referred to.

As is usual the start key, on starting up on a run, must be kept depressed for the usual several cycles. Starting up is prevented until the feed rack of the punch is in right hand position, this being provided for by contacts P—1. The usual card feed cycles ensue and at the beginning of the second card feed cycle, the card traverses the brushes 33 (Figs. 2 and 7a) and the multiplier and multiplicand amounts are read from the card.

The customary plug board 34 is provided and the customary plug connections are made on this plug board. The wiring generally designated 35 (Fig. 7a) provides for the entry of the multiplicand into the MP—2 receiving device at the time the multiplicand is being entered into MC—1. 36MC—1 represent the accumulator or entry receiving device magnets of MC—1 and 36MP—2 represent such magnets of MP—2. Wiring designated 37 provides for entering the multiplier amount into MC—2.

At the end of the first card feeding cycle the card lever contacts 38 (Figs. 2 and 7e) become closed by the card, causing energization of relay coil H, whereupon relay contacts H—1 (Fig. 7a) will shift to reverse position from that shown. As the card is carried past the brushes, entries will be made. The current flows from the A. C. line 29, through the now shifted H—1 contacts, through cam contacts FC—7, through the impulse distributor 24 to the usual card transfer and contact roll 39, thence through the brushes 33 pertaining to the multiplier, through the plug connections and through the circuits shown to enter the multiplier amount into MP—1 and also into MC—2. Likewise the multiplicand is entered into MC—1 and into MP—2.

At the beginning of the second card feed cycle the closure of cam contacts FC—11 (Fig. 7e) will cause energization of relay coil G, the circuit being completed through the card lever contacts 38. The energization of relay coil G will shift the G—1 relay contacts and establish a circuit to cam contacts FC—2. Energization of coil G will also close stick contacts G—2 and establish a stick circuit for coils G and H either through the FC—2 contacts or the card lever contacts 38. As usual, FC—2 provide for the overlapping of the time when the card lever contacts 38 open between cards.

The card is fed through the card handling section of the machine and ultimately it passes to the R position in the punch (see Fig. 1a), closing card lever contacts 40 (see Figs. 2 and 7e) and causing energization of relay coil F and bringing about the shifting of relay contacts F—1 to reverse position from that shown.

In starting up the machine the punch racks are in extreme outer position and accordingly, the customary P—1, P—3, P—4 and P—5 contacts are closed. With contacts P—5 closed, relay coil K will be energized (Fig. 7e) and the K—1 relay contacts will be shifted to reverse position from that shown. Upon the shifting of relay contacts F—1 and upon the closure of cam contacts CC—3, a circuit will be established to the punch clutch magnet 41. This circuit is completed to the other side of the line through the punch contacts P—3 now closed and the relay contacts K—1 which are in shifted position. The energization of the punch clutch magnet 41 will cause closure of the customary contacts 42 which become latched closed by the usual latch and afford supply for the punch driving motor M—2. The card which had been previously read and which is now in the punching unit in the R position is now advanced endwise through the punch unit to a position in which punching is to commence.

Multiplying operations are initiated by the reset of the LH—1 accumulator. The energization of relay coil H in the manner previously explained will shift relay contacts H—1 (Fig. 7a) to reverse position. Upon closure of cam contacts FC—15 a circuit is completed through the shifted H—1 contacts, through contacts AA—1 now closed, to and through the 16LH—1 reset initiating magnet and back to ground through FC—15. Energization of 16LH—1 initiates resetting of the LH—1 accumulator. It may be explained that LH—2 reset is brought about later in the cycle of operations of the machine and such reset is initiated through the following circuit. Upon closure of cam contacts CC—2 (Fig. 7a) current flows through the K—2 relay contacts now closed, through the L—2 relay contacts now closed, through the F—2 relay contacts now closed, the Q—1 relay contacts now closed, to magnet 16LH—2 and back to ground. Energization of 16LH—2 brings about LH—2 reset. Such reset cannot occur until the K—2 contacts are closed, which can occur only when a card is in the punch beyond the last columnar position or in starting up the machine when the punch racks are in proper position, i. e. extreme outer position. Also reset of this accumulator cannot take place until a card has reached the R position in the punch and brought about closure of relay contacts F—2.

Figure 7A:
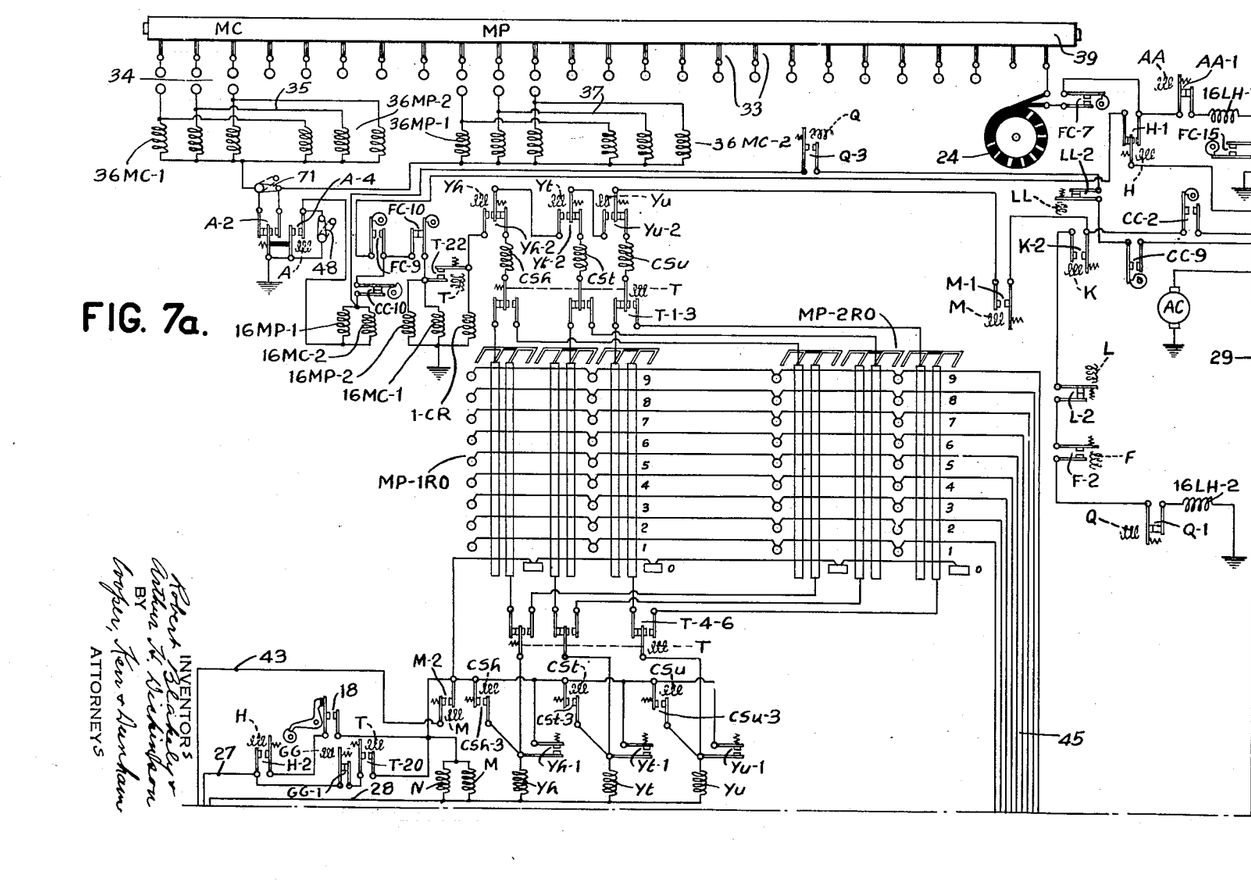

Upon reset of LH—1 a circuit is established traced as follows: Referring to Fig. 7a, a circuit will be established from the 27 side of the D. C. line, through relay contacts H—2 now closed, through reset contacts 18, which close on LH—1 reset, to and through relay coils M and N and back to the other side of the line. Energization of coil M will close relay contacts M—1 and M—2. M—2 upon closure, afford a stick circuit for relay coils M and N, the stick circuit extending back through wire 43 (Figs. 7a to 7e inclusive) to and through relay contacts S—1 now closed and back to the 27 side of the D. C. line.

The cycle controller need not be here described in detail as it is identical to the cycle controller shown and described in the Daly patent above referred to. The cycle controller comprises the usual Yu, Yt and Yh coils, the related Yu—2, Yt—2, and Yh—2 transfer contacts, the column shift relay coils CSu, CSt and CSh and also the customary Yu—1, Yt—1 and Yh—1 stick contacts and the customary CSu—3, CSt—3 and CSh—3 column shift control contacts. This cycle controller cooperates in the usual way with the readouts of the multiplier entry receiving devices, but inasmuch as a readout for one calculation has to be derived from MP—1RO and a readout has to be derived from MP—2RO for another calculation, shiftable multi-contacts T1—3 are provided which are in the position shown for the first calculation and in shifted position for the second calculation. Similar shiftable multi-contacts T4—6 are provided for selectively associating the Y coils with either MP—1RO or MP—2RO. It will be assumed that the cycle controller has been set up in the usual manner under the control of MP—1RO. Upon the energization of relay coil M in the manner previously explained, relay contacts M—1 close.

Following the set up of the cycle controller, cam contacts CC—2 close. Current flows from the A. C. line 29, through cam contacts CC—2, through relay contacts M—1 now closed, through the Yu—2 transfer contacts, which are in the position shown, down through the CSu relay magnet, through the T—1 contacts, out via the brush which is standing say on the 5th spot of MP—1RO of the units order, down through the 5th line of the group of wires generally designated 45, to the X—5 multiplier relay magnet. Energization of X—5 brings about the multiplying computation and an energization of CSu directs the entries into the proper columnar orders of the RH and LH—1 accumulators.

Figure 7B:
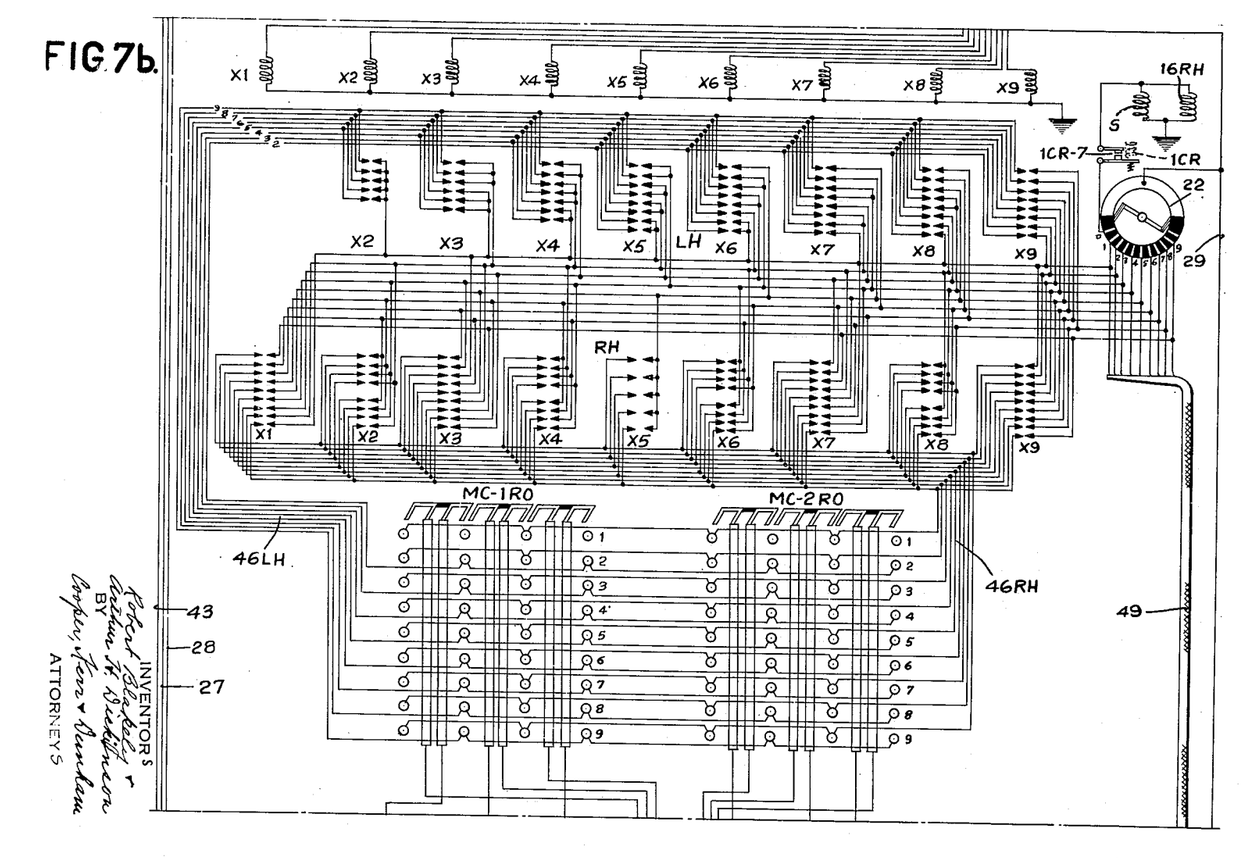
Figure 7C:
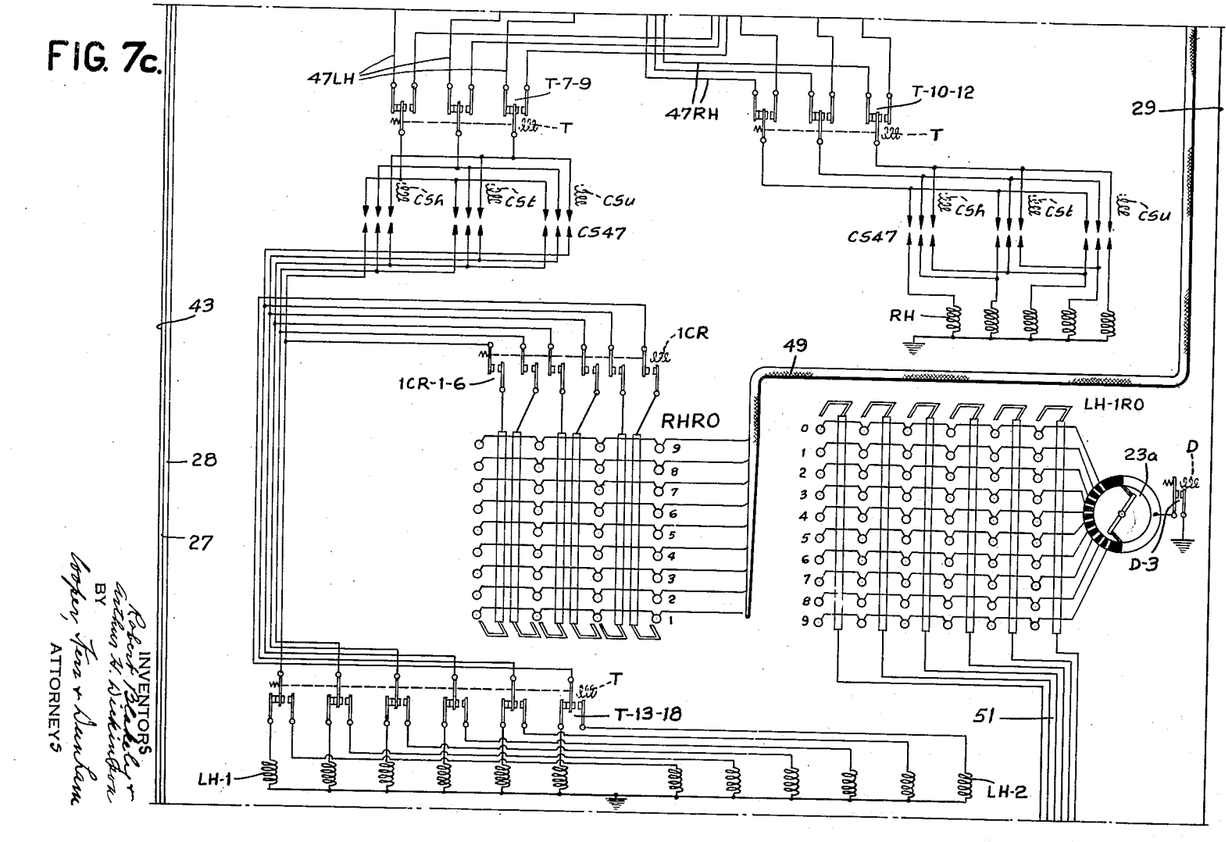

The manner of effecting multiplication need not be traced in detail, but it is sufficient to state that upon the energization of an X magnet of the multiplying relays the related circuits of Fig. 7b are established and at the proper time in the operation of the machine current flows from emitter 22 through the multiplier relay control contacts. These impulses flow over the lines 46LH and 46RH to and through the MC—1RO out via the 47LH lines and 47RH lines to and through the T7—9 and the T10—12 multi-contacts which are now in the position shown, to and through the closed ones of the column shift contacts generally designated CS—47 to the RH accumulator magnets designated RH on Fig. 7c. The entries into the LH—1 accumulator flow through the T13—18 multi-contacts now in the position shown to the LH—1 accumulator magnets. Multiplication proceeds in the usual way, order by order, in the manner explained in the Daly patent until the first calculation is completed. At this time all the Y—2 set of contacts will have been shifted to reverse position from that shown and upon closure of cam contacts CC—2 there is a circuit path from the 29 side of the A. C. line through CC—2, through M—1 now closed, through the shifted Y—2 contacts, to the 1—CR relay magnet and back to ground. Energization of 1—CR (Fig. 7a) permits closure of the related relay contacts 1CR—1 to 6 (Fig. 7c) and 1CR—7 (Fig. 7b). Closure of the 1CR—1 to 6 contacts connects the RHRO readout with the LH—1 accumulator so that upon operation of emitter 22 impulses are emitted through RHRO to transfer the entry therein into LH—1. These impulses to RHRO are emitted through wires in a cable 49 (see Figs. 7b and 7c). At the completion of such impulse emission the emitter brush on encountering the extra spot supplies current through 1CR—7 to a relay magnet S and to the 16RH reset magnet. Energization of 16RH initiates reset of the RH accumulator. In lieu of breaking down the setup of the cycle controller upon MC reset as in previous machines, the relay S is utilized to break down the setup of the cycle controller. Upon energization of coil S, relay contacts S—1 (Fig. 7e) open and break the 43 circuit (Figs. 7e to 7a), thus breaking the stick circuit for relay coils M and N and for all the Y magnets, thus preparing the cycle controller for control upon a following second or checking calculation.

The machine has now completed the calculation which involves the multiplication of MC—1 by MP—1 and it is now ready to re-compute a checking calculation with reverse multiplier and multiplicand entries. Before this checking calculation or re-computation is initiated, it is necessary to shift the cycle controller connections and column shift connections from their previous status to their second status wherein the cycle controller and column shift cooperates with MP—2RO. Before such re-interrelation occurs, LH—2 reset and RH reset occur. LH—2 was reset in the manner described above. Upon LH—2 reset, reset contacts 20 (Fig. 7d) close to energize relay coil XX, which coil is held energized through stick contacts XX—1 and through cam contacts FC—23. Upon RH reset, reset contacts 17 close, energizing relay coil ZZ, which is held energized through stick contacts ZZ—1 and cam contacts FC—23. With coils ZZ and XX thus energized, relay contacts ZZ—2 and XX—2 are closed, completing a pickup circuit for relay coil T. This circuit is traced as follows: From the 27 side of the line (Fig. 7d), through coil T, through contacts XX—2, ZZ—2 to line 28. Relay coil T upon being energized, establishes a stick circuit for itself through relay contacts T—19 and cam contacts FC—16. The energization of relay coil T will shift all of the related T contacts to a reverse position from that shown.

Referring to Fig. 7a, the T—1 to 3 contacts and T—4 to 6 contacts upon being shifted, correlate the cycle controller and column shift controls with MP—2RO and disassociate these controls with MP—1RO.

The machine is now ready to initiate the second multiplying or checking operation. Provision must be therefore made to re-energize relay coils M and N. The pickup circuit for relay coils M and N will be as follows: From the 27 side of the line (Fig. 7a), through relay contacts GG—1 now closed, relay contacts T—20 now closed, to relay coils M and N and back to the other side of the line. A second series of multiplying computations now ensue and in this case the amount standing in MP—2, while constituting the multiplier amount, will comprise the multiplicand of the previous computation and the amount standing in MC—2 while constituting the multiplicand in the new calculation, will constitute the multiplier of the previous calculation. During the second set of calculations all of the T relay contacts, including contacts T—7 to 9 and T—10 to 12 (Fig. 7c) will be in shifted position. Accordingly, the entries will flow out from MC—2RO, through the wires shown to these contacts and thence the entries of right hand components will go to the RH accumulator magnets of Fig. 7c and the entries of left hand components, instead of going to LH—1 (Fig. 7c) as in the previous computation will go to LH—2 by reason of the shift of the relay contacts T—13 to 18 to reverse position from that shown.

At the completion of multiplying by the different orders of the multiplier, the usual RH to LH transfer will take place, but in this instance, the entries in RH, instead of going to LH—1 as in the previous computation, will go to LH—2 by reason of the shift of relay contacts T—13 to 1.

Figures 3, 7E:
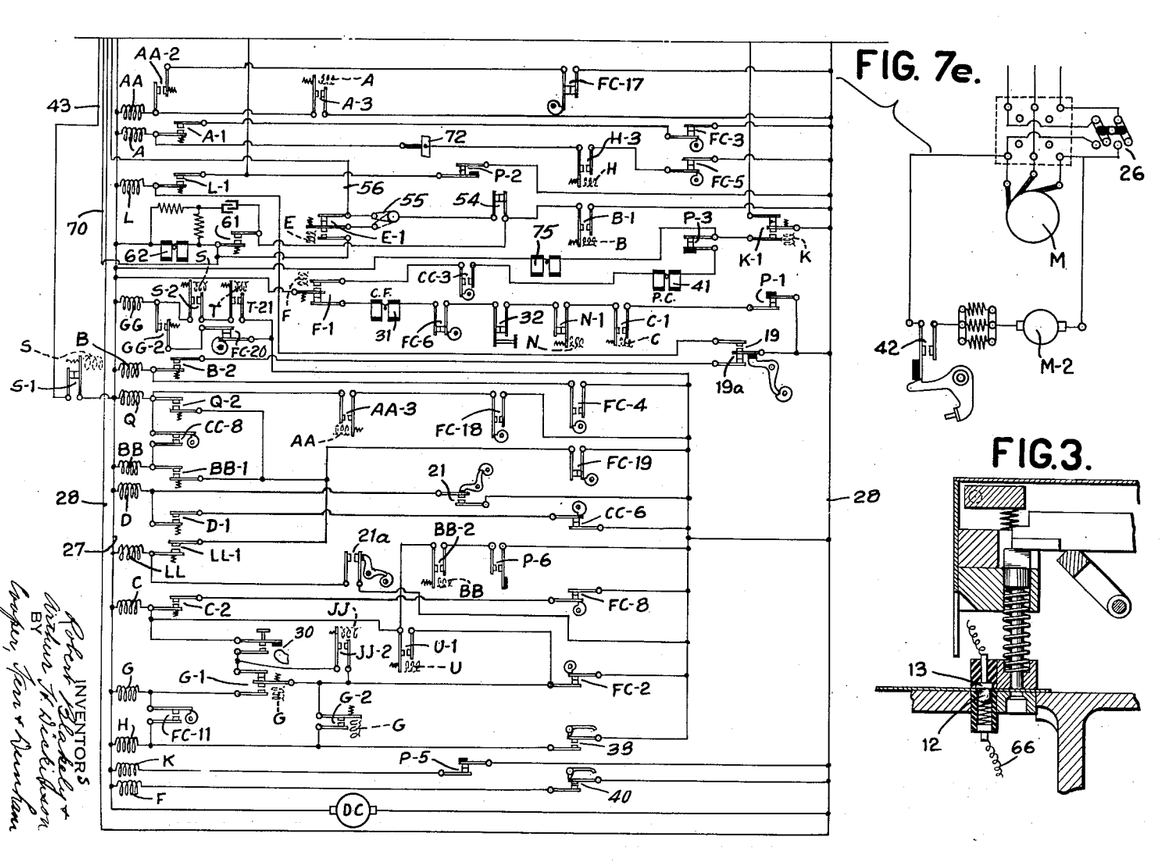
Fig. 3 is a detail view showing the sensing means for reading perforations in the records as they pass through the punching section of the machine.
Figs. 7a, 7b, 7c, 7d and 7e, taken together and arranged vertically in the order named show the complete circuit diagram of the machine.

At the completion of all of the foregoing operations, the product which was re-computed with reverse entry relations of the multiplier and multiplicand amounts will be set up on LH—2. Provision must be made to de-energize relay coils M and N at the end of the second computation. As previously explained on RH to LH transfer, relay coil S (Fig. 7b) becomes energized. Relay coil S will close relay contacts S—2 (Fig. 7e). With relay coil T energized, relay contacts T—21 will be closed and a circuit wil be provided to energize relay coil GG. Relay coil GG once energized is maintained energized by stick contacts GG—2. The stick circuit is completed through cam contacts FC—20 (Fig. 7e). With relay coil GG thus energized, relay contacts GG—1 (Fig. 7a) open, breaking one circuit to coils M and N. At the same time that such circuit is broken, relay contacts S—1 will become open to break the holding circuit for relay coils M and N through the M—2 relay contacts.

It may be explained that on a second set of calculations during the RH to LH transfer, reset of MP—1, MP—2, MC—1 and MC—2 is effected. Such reset is brought about in the following manner. During the last multiplying cycle an initiating circuit is established for bringing about such reset in the following RH to LH transfer cycle. The initiating circuit is as follows: From line 29 (Fig. 7a), through cam contacts CC—2, through the M—1 relay contacts now closed, through the Y—2 transfer contacts all now in shifted position, through the T—22 relay contacts now closed, to the 16MC—1 and 16MP—2 reset magnets. A circuit is also established through the FC—10 cam contacts, the CC—10 cam contacts to the 16MP—1 and 16MC—2 reset magnets. The return circuit for these magnets is through a switch 48 now in closed position and back to ground. Upon the energization of reset magnets 16MP—1, 16MC—2, 16MP—2 and 16MC—1 reset is brought about in the customary manner.

The machine is now ready to compare the amount of the first computed product standing on LH—1 with the supposedly identical re-computed product standing in LH—2. Generally comparison is effected by an auto-control of conventional form disposed between the LH—1 and LH—2 readouts. Comparison is initiated upon MC—1 reset. Upon MC—1 reset, reset contacts 21 (Fig. 7e) close, bringing about energization of relay coil D, which establishes a stick circuit for itself through the D—1 relay contacts and cam contacts CC—6. With relay D energized, relay contacts D—2 (Fig. 7d) become closed, providing current supply for emitter 23 from the A. C. line 29. Relay contacts D—3 (Fig. 7c) also close upon energization of relay coil D.

Figure 7D:
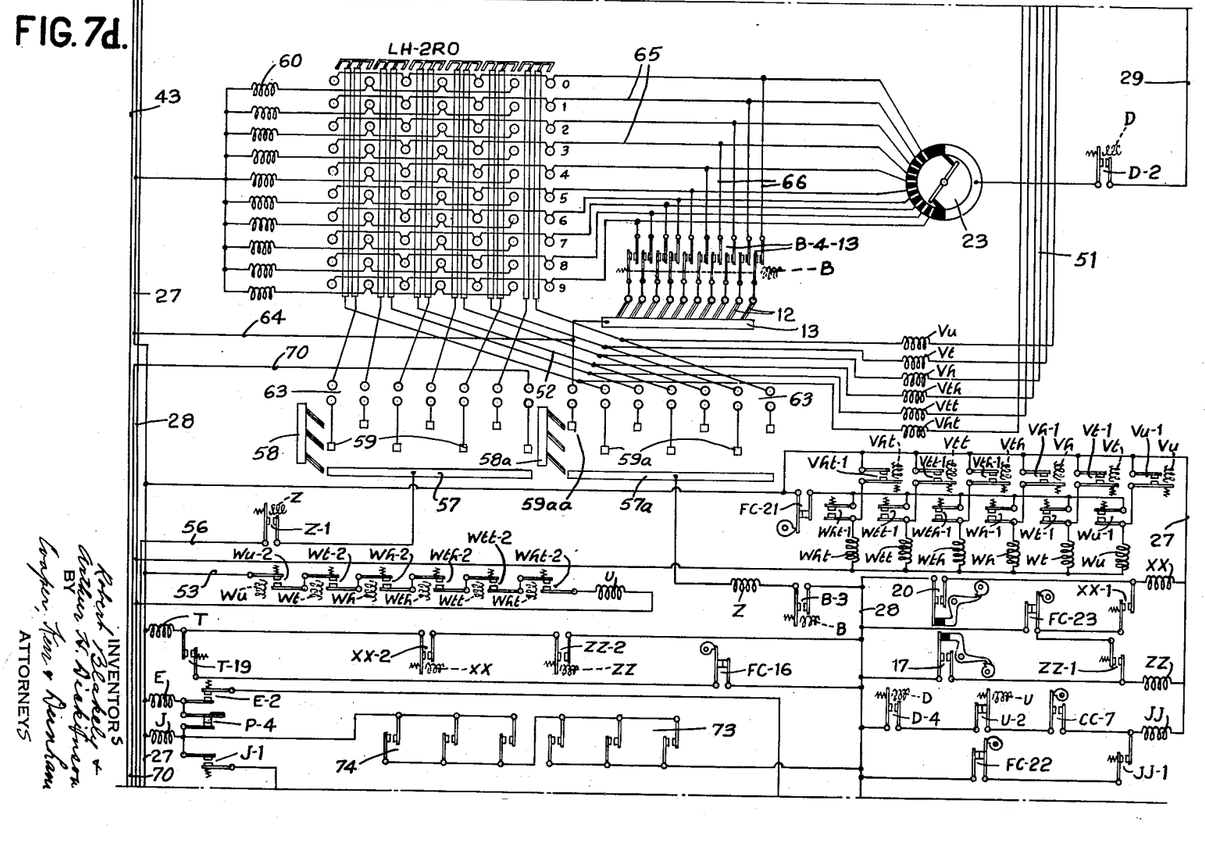

With relay contacts D—3 closed, emitter 23a (Fig. 7c) is connected to ground. Emitter 23 emits impulses through the LH—2 readout out through lines 52, through the auto-control magnets V$u$ to V$ht$ inclusive. From these auto-control magnets the impulses flow through wires 51 to and through LH—1RO, to and through the emitter 23a, through the now closed D—3 relay contacts to ground. It will be understood that the auto-control magnet coils V$u$ to V$ht$ inclusive, will become energized if an identical amount is standing in LH—1 and LH—2. If the amounts do not compare in any particular column, one or another of the auto-control magnets will not become energized. The auto-control magnets have associated therewith related pickup contacts V$u$—1, V$t$—1, etc., which close upon the energization of their related V coils and cause energization of related coils W$u$ to W$ht$ inclusive. Stick contacts W$u$—1 to W$ht$—1 are provided for these W coils so that the W coils will remain energized upon their being picked up, the stick circuit being completed through cam contacts FC—21. As is customary in auto-control circuits, see for example Lake et al. Patent No. 1,987,343, series contacts W$u$—2 to W$ht$—2 are provided in a testing circuit 53. It will be understood that if the amounts in LH—1 and LH—2 do not compare, one or another of the W—2 contacts will not be closed, hence there will be no completion of the series circuit 53. If the amounts do compare on the other hand, the series circuit 53 will be completely established. Disposed in the series circuit 53 is a control relay coil U. Such relay coil U becomes energized if the amounts compare and remains de-energized if the amounts do not compare. With relay coil U energized, relay contacts U—I (Fig. 7e) become closed, energizing relay coil C through the now closed FC—2 contacts. With relay coil C energized, relay contacts C—I become closed and there is a re-energization of the card feed clutch magnet 31. The circuit is from line 28, through the P—I contacts now closed, through contacts C—I now closed, through contacts N—I, through 32, through FC—6, through 31, through relay contacts F—I in the position shown.

The above has described the sequence of operations which take place when the amount in LH—I compares with the amount in LH—2.

Before describing further operations following such a comparison, an explanation will be given of the operations which are brought about when the amounts do not compare. Under these conditions the series circuit 53 (Fig. 7d) will not be completed. Relay coil U will not become energized, relay contacts U—I (Fig. 7e) will not close, relay coil C will not become energized and a new card feeding operation will not be initiated.

With card feed initiation held up due to a failure of comparison, the card will be left in the punch. It can then be released by hand and removed and a new card feed can be started up by a hand initiated operation.

It may be explained that relay contacts G—I (Fig. 7e) are provided to prevent a hand initiated card feed with cards in the machine. When a hand start is to be effected following a failure of comparison, provision must be made for short circuiting these contacts which would otherwise prevent a hand initiated re-start. At such time following a failure of comparison relay coil D will still be energized and accordingly relay contacts D—4 (Fig. 7d) will be closed. Upon failure of comparison relay coil U will not be energized so that the U—2 relay contacts (Fig. 7d) are closed. Accordingly, upon closure of cam contacts CC—7, relay coil JJ will be energized and will be maintained energized by a stick circuit completed through stick contacts JJ—I and cam contacts FC—22. With relay coil JJ thus energized, relay contacts JJ—2 (Fig. 7e) close, providing a shunt around the G—I relay contacts so that a new card feed can be initiated by the depression of the start key to close contacts 30.

The foregoing description has explained the operations for multiplying and checking, involving detail cards and has explained the manner of ascertaining a check or non-check of computing operations and the previous description has also explained the manner in which card feeding operations are initiated automatically for the record card upon a check condition of the card just computed and the manner in which card feed for a following card may be initiated by hand upon a non-check condition of the previous card.

It will be understood, as will be hereinafter explained in detail, that following checking of computing upon one card and while card feed and regular multiplying operations are taking place on a following card, punching and checking of punching is effected for the previous card provided the computation for such card has checked. Furthermore, if recording (i. e. punching) has been correctly effected on the first card as ascertained by checking, computing and re-computing, checking operations proceed for the following card. On the other hand, if recording on the first card be effected incorrectly as ascertained by checking, in this event operations upon the second detail card will proceed only so far as to permit the completion of the first or regular computing operation on the following or second detail card. When the incorrectly punched first detail card is removed, re-computing operations pertaining to the second or following detail card are initiated automatically; the automatic initiation being brought about upon release of the incorrect card for removal.

Assuming the amounts compared, the machine is now ready to punch the product back on the record from which the factors were derived. This is effected as follows: Early in the card feed cycle, initiated as previously described, cam contacts FC—4 (Fig. 7e) become closed, energizing relay coil B. Coil B is maintained energized by stick contacts B—2, through LH—2 reset controlled contacts 19a. The energization of relay coil B closes relay contacts B—I and a circuit is established from the 28 D. C. line, through contacts B—I now closed, through the escapement contacts 54, through a switch 55 which is in the position shown for regular multiplying operations, through a wire 56 to and through the now closed Z—I contacts (Fig. 7d) to the readout strip 57 of the punch. With current supplied to the common strip 57 of the punch and with the brush 58 standing on the first of the spots 59 at the first product punching position punching will commence, there being a readout from the related section of LH—2RO and an energization of the punch selector magnets 60. It will be understood that the customary plug connections are provided at plug board 63. Closure of the B—I relay contacts (Fig. 7e) also supplies current to the contacts 61 of the punch, which contacts are closed by interposer action in the usual way to supply current to the punch operating magnet 62. Punching of one column will then occur.

According to the present invention, provision is made after each column is punched to check the punching against the amount standing in the LH—2 accumulator. For this purpose the punch is provided with a supplemental readout strip 57a, a supplemental segment brush 58a and supplemental segment spots 59a. The supplemental spots are wired to one section of LH—2RO and the regular spots 59 are wired to another section of LH—2RO. When the first columnar position is being punched, relay contacts B—3 (Fig. 7d) will be closed, and relay coil Z will be energized, the return circuit for coil Z being through the supplemental strip 57a, the brush 58a and a supplemental first spot which will be designated 59aa, this spot being wired back to line through a plug connection at the plugboard and through a wire 64. The above control circuit will provide for the closure of the Z—I contacts on punching the first column. After the first column is punched the brushes 58 and 58a shift to the next spot to the right and the control circuit for relay coil Z is altered. Upon a shift which takes place following punching in the first column, the control circuit for Z will be as follows: From line 28, through relay contacts B—3 now closed, through coil Z, through 51a, through the brushes 58a, to the first of the spots 59a, through a plug connection at plug board 63, through the left hand one of the 52 group of wires to the column of the readout LH—2RO pertaining to the order punched on the previous operation, via the brush of the readout on this order, back via the line of the 65 group corresponding to the digit previously punched, down via one of the corresponding wires 66, through the B4—13 relay contacts now closed, through the sensing means 12—13, (see also Fig. 3) back via wire 64 to the other side of the line.

It will be understood that relay coil Z will become energized under this condition only when the amount standing in a given order of LH—2RO corresponds to the amount previouly punched and sensed by the sensing means 12—13. With the Z relay coil energized in this manner, relay contacts Z—1 will again close and permit another punching operation pertaining to the next column. This operation will continue until the complete product is punched, provided there is no interruption of the circuit controlling punching, due to possible improper perforation of the record card. When any card reaches beyond the last column position in the punch, the last column P—5 contacts will have closed, energizing relay coil K, closing the K—1 contacts and bringing about energization of the eject magnet 75, which will cause ejection of the card from the punch in the usual manner.

In order to check the last column, the usual skip bar in the punch must be cut so as not to control skipping until the last column has been checked. Upon checking the last column, the Z—1 relay contacts will be closed in the manner previously described and a circuit 70 is established to energize the punch magnet 62 and cause the escapement to operate and skip the card a further column, at which position the usual skip bar is effective to skip out the card.

If for any order relay coil Z does not become energized, further punching is immediately terminated and the card remains in the punch. With the card so remaining in the punch, it does not reach the last column position, accordingly, the last column contacts P—5 (Fig. 7e) do not re-close and there is no energization of relay coil K at this time. With K thus remaining de-energized, the K—2 relay contacts (Fig. 7a) remain open and LH—2 reset is prevented because there is no energization of the 16LH—2 reset initiating magnet. The reset initiating circuit is normally from 29, through cam contacts CC—2, through relay contacts K—2, through relay contacts L—2, F—2 and Q—1, through 16LH—2 and back to ground. With LH—2 reset thus prevented, the reset control contacts 20 (Fig. 7d) do not become closed, but remain open. Relay coil XX remains de-energized and relay contacts XX—2 remain open. Accordingly, there is no energization of the T relay coil. Relay coil T has to be energized to energize relay coils M and N, which coils, if properly energized would bring about further multiplying operations with reverse entry relations of the multiplier and multiplicand. Thus further checking operations will be terminated and the operator is then compelled to release the incorrect card by hand. This is effected by depressing the usual release key of the punch. Previously to depressing the release key, RH reset will have occurred and such reset will have brought about closure of contacts 17 and energized relay coil ZZ, which remains energized by its stick circuit through stick contacts ZZ—1 and a cam contacts FC—23. With relay coil ZZ thus energized, relay contacts ZZ—2 become closed so that upon a hand initiated release of the card the K relay coil will become energized in the usual way. The K—2 relay contacts (Fig. 7a) will close, permitting LH—2 reset by the energization of magnet 16LH—2 whereupon upon such reset the XX relay coil (Fig. 7d) will become energized, closing relay contacts XX—2 and permitting energization of relay coil T. With relay coil T thus energized, further calculating cycles will ensue.

Rate card checking

Previous checking devices for multiplying machines have been adaptable for checking of runs wherein both factors were taken from each detail card, but previous checking arrangements were not adaptable for rate card operations wherein the multiplier factor was derived from the leading card of the group and retained in the multiplier entry receiving device for the following detail cards of the group from which the multiplicand was derived. The controls of previous checking machines were not adaptable for performing checking operations when the original run of calculations were so-called rate card operations. The reasons why such previous machines were not adaptable for checking on rate card operations were that the reset controls for the multiplier and multiplicand receiving devices were not designed for such checking operations and furthermore the re-initiating controls for card feed were not designed for operation when checking was attempted on rate card runs. Previous machines which involve rate card operations include so-called list contacts in a particular receiving device, viz. the multiplier entry receiving device and the absence of such list contacts in the other receiving devices prevented checking operations upon rate cards.

According to the present invention, provision is made to carry out checking either on regular run detail card operations in the manner previously described or upon rate card operations, as will now be described.

Generally stated, upon rate card operations wherein the multiplier is derived from a leading rate card and the multiplicands are successively derived from following detail cards, the multiplier amount is derived from each leading rate card and entered into the MP—1 and the MC—2 receiving devices and retained therein until a new master or rate card comes along and its presence is sensed. After entry of such multiplier the multiplicand amount is derived from each following detail card and entered into the MP—2 and MC—1 receiving devices. These devices of course are cleared after each operation pertaining to one card so that they can receive a new amount from a following detail card. Upon rate card operations, checking of computing and checking of recording for each detail card is effected in a generally similar manner to the checking for regular multiplying operations.

With the present machine, where a master or rate card is followed by a detail card, so-called dummy multiplying operations, with following reset operations of MC—1 and MP—2 and RH to LH transfer operations are eliminated. While the elimination of dummy multiplying operations is per se old in machines of this class, the elimination of reset and RH to LH operations is broadly new and saves machine time.

With the present machine, where a rate card is followed directly by another rate card, provision is made for resetting the MP—I and MC—2 receiving devices. This is done to avoid accumulation of multiplier amounts therein. They are accordingly reset before the following card is fed and the multiplier amount therefrom entered into the receiving devices. A special control is provided for this last mentioned purpose and such control is effective only when one master or rate card is directly followed by another master or rate card.

Accordingly, with the present machine, controls are provided to eliminate dummy multiplying operations, reset and transfer cycles following the feeding of a rate card when it is followed by a detail card and controls are also provided to include a special reset cycle or cycles when two or more master or rate cards follow in direct succession.

In order to set the machine in condition for checking upon rate card operations, the operator shifts switches 48 and 71 (Fig. 7a), to the dotted line position and shifts switch 55 (Fig. 7e) to the dotted line position. Cards are placed in the magazine 25 (Fig. 2) in the usual manner and operations are started up in the usual way by depressing the start key. Towards the completion of the first card feed cycle the X brush 72 (Fig. 7e, see also Fig. 2) reaches the X or extra index point position upon the card. This brush corresponds to brush 106 (Fig. 4) of Daly Patent No. 2,045,437. Upon encountering the extra perforation in a rate card at such position a circuit is established from the 27 side of the line (Fig. 7e), through relay A, through the X brush 72, through the H—3 relay contacts now closed, through the FC—5 contacts which close at the proper time to the other side of the line. Energization of relay coil A closes stick contacts A—I, the stick circuit being completed to line through the FC—3 contacts.

With relay coil A thus energized, relay contacts A—2 (Fig. 7a) shift to reverse position from that shown and provide for an entry of the multiplier amount derived from the rate card into MP—I and MC—2. With relay coil A energized, relay contacts A—3 (Fig. 7e) close, energizing relay coil AA which is maintained energized by a stick circuit through contacts AA—2 and cam contacts FC—17. The relay contacts A—4 (Fig. 7a) establish a return circuit for the 16MP—I reset magnet and the 16MC—2 reset magnet so that the corresponding receiving devices will become reset concurrently with the reset of the MC—I and MP—2 receiving devices at the end of a run of computations on a number of detail cards. Such reset will occur prior to the reading in of the new multiplier from the new rate card.

As is customary, provision is made to eliminate punching back an imaginary product on a rate card and this is effected by means of the usual E—I relay contacts (Fig. 7e).

Referring to Fig. 7d, 73 and 74 are the usual so-called list contacts and such contacts are provided both in the MP—I and the MC—2 receiving devices. All of the contacts 73 are in parallel with one another and all of contacts 74 are in parallel with one another, but the 73 and 74 sets are as a group disposed in a series circuit. Accordingly, provided there is an entry of a significant multiplier amount in both MP—I and MC—2, such list contacts will, upon closure, complete the series circuit and energize relay coil J. It will be understood in connection with these list contacts that the identical figure is entered in each receiving device. The energization of relay coil J will close stick contacts J—I and establish a stick circuit through punch contacts P—2 (Fig. 7e) now closed. Upon the energization of coil J and closure of the J—I relay contacts a circuit is also established through the now closed P—4 punch contacts to energize relay coil E which, when energized, closes stick contacts E—2. Relay coil E remains energized as long as coil J is energized and as long as contacts P—4 are closed. The rate card passes through the card handling section of the machine and after reaching the punch, immediately is traversed to the position at which product punching would normally begin to occur.

Such traverse of the card will have brought about the opening of punch contacts P—5 (Fig. 7e) and such contacts open before punch contacts P—4 open. The opening of punch contacts P—5 will de-energize relay coil K so that the relay contacts K—I (Fig. 7e) assume the position shown in the diagram. With the relay contacts K—I in this position a stick circuit is established for relay coil E through relay contacts E—2 now closed. Ultimately punch contacts P—4 open in the customary manner, and punch contacts P—2 open to break the stick circuit for relay coil J. At such time the 73 and 74 list contacts will have re-opened because such contacts only close momentarily during the entry of an amount from the rate card. The energization of relay coil E which is brought about in the manner above explained will have shifted the E—I relay contacts (Fig. 7e) to reverse position from that shown in the diagram. These E—I relay contacts when closed provide for the escapement of the card through the punch in a manner hereinafter to be described.

Previous explanation has been made as to the manner in which relay coil AA was energized, and with such coil energized relay contacts AA—I (Fig. 7a) open. With such contacts in open position the circuit to the 16LH—I reset magnet is open and reset of this accumulator is prevented. It will be recalled that multiplying operations are initiated upon reset of the LH—I accumulator and with such reset prevented, initiation of multiplying operations, which would otherwise occur on the rate card, is prevented. In short, the usual idle multiplying cycles, which occurred with the previous construction of Daly Patent No. 2,045,437, are eliminated. The energization of relay coil AA closes relay contacts AA—3 (Fig. 7e) and brings about energization of relay coil Q upon closure of cam contacts FC—18. A stick circuit is provided for coil Q through the Q—2 relay contacts and cam contacts FC—19. The energization of relay coil Q opens relay contacts Q—I (Fig. 7a) and prevents an energization of the 16LH—2 reset magnet to suppress reset which would otherwise occur.

Upon feeding of the rate card, relay coil B will become energized upon closure of cam contacts FC—4 (Fig. 7e) and such relay coil will be maintained energized by the stick contacts B—2 and by the 19a reset control contacts which are now closed. With relay coil B energized, relay contacts B—I will be closed so that a circuit will be established from the 28 side of the line, through relay contacts B—I, through the escapement contacts 54, switch 55 now in the dotted line position, through the E—1 relay contacts, direct to the punch operating magnet 62. With such magnet energized the card will escape through the punch step by step under the control of the escapement contacts. The rate card ultimately passes through the punch and is ejected.

As explained before with the present construction there are no dummy multiplying operations, but in lieu thereof a new card feed is immediately initiated after the feed of the rate card. This new card feed is initiated in the following manner: Following the energization of relay coil Q, cam contacts CC—8 close and bring about an energization of relay coil BB. BB upon being energized, is maintained energized through stick contacts BB—1 and cam contacts FC—19. With relay coil BB energized, relay contacts BB—2 (Fig. 7e) close and a circuit is now established through the now closed P—6 punch contacts, through the closed BB—2 relay contacts to energize relay coil C. The P—6 punch contacts, just referred to, become closed during the feed of the master card from the R position in the punch unit to the first punching position. Such P—6 contacts become closed when the right hand punch rack 14 has reached its extreme left hand position during the movement thereof (see Fig. 4, which shows these contacts in their normal open position). With C energized, upon closure of the usual P—1 punch contacts, there will be an initiating circuit for the card feed clutch magnet 31, through the path which was previously traced. A new card feed will now be initiated.

With the present construction, the interval between the feed of a rate card and the initiation of a following card feed is merely dependent upon the time for the rate card to pass into the punch and be ejected. It will be understood that the card feed that follows a rate card will be the feed of a detail card and the multiplicand amount is read and entered into the machine from such detail card. Before entry of the multiplicand from such detail card the A relay coil will have become de-energized by the opening of cam contacts FC—3 (Fig. 7e). Accordingly, the A—2 and A—4 relay contacts (Fig. 7a) will shift back to the position shown in the diagram and there will be entry of the multiplicand amount from the detail card into MC—1 and MP—2. The checking operations then follow in the manner previously explained for regular checking and description of these operations need not be here repeated.

It will be recalled that the multiplier amount has been retained in the MP—1 and MC—2 receiving devices during all detail card operations. Provision must be made to bring about reset of these receiving devices when a new rate card comes along. The feed of a new rate card brings about energization of relay coil A and shifts the A—4 relay contacts to reverse position from that shown on Fig. 7a. With such contacts shifted the 16MP—1 and 16MC—2 reset magnets can be energized and their energization will bring about the reset of the corresponding receiving devices so that upon further traverse of the rate card through the card feed section of the machine the multiplier amount may be entered therein.

Generally it has been explained that special reset control is provided to reset MP—1 and MC—2 in the event of master or rate cards following in direct succession. In detail this control is provided for in the following manner: Upon rate card operation relay coil A (Fig. 7e) is energized in the manner previously explained. Coil A when energized closes A—3 and energizes AA. AA—3 then close and upon closure of FC—18 relay coil Q becomes energized. Q is maintained energized to and into the next card feed cycle. When one rate card directly follows another A will be energized again under the X brush control of the following rate card at the time Q is energized. The overlying energization of A and Q only occurs with the condition where one rate card directly follows another. With A and Q both energized, A—4 and Q—3 (Fig. 7a) will be closed, whereupon when CC—9 close a reset initiating circuit will be established as follows: From line 29, through CC—9, LL—2 now closed, through Q—3 now closed, to and through the 16MP—1 and 16MC—2 reset magnets, through the A—4 contacts to ground. This will bring about MP—1 and MC—2 reset and such reset will repeat at a proper time if further rate cards follow in automatic succession. Upon MC—2 reset the contacts 21a (Figs. 1 and 7e) will close and energize LL through a circuit traced as follows: From the 28 side of the line, through contacts 21a, through LL to line 27. LL will be stuck by stick contacts LL—1, through a line extending through FC—19. With LL energized, LL—2 (Fig. 7a) will open and prevent a successive reset upon an immediately following cycle. If, say, three rate cards follow in direct succession, the FC—19 contacts will bring about the de-energization of LL and allow LL—2 to reclose so that another reset may occur with the overlapping energization of coils A and Q.

To prevent a back circuit from the 16MP—1 and 16MC—2 energizing circuit to magnets 16MP—2, 16MC—1 and associated circuits, cam contacts CC—10 are provided in the circuit intermediate FC—10 and 16MP—1, etc. These cam contacts CC—10 are timed to open at the time when CC—9 are closed and prevent such undesired back circuit.

With the present machine, the customary L relay control (see Fig. 7e) is provided. This L relay coil is energized when the LH—2 accumulator is reset, such reset bringing about closure of reset contacts 19. With the L relay coil energized, stick contacts L—1 are closed and a stick circuit is provided through punch contacts P—2. With the L relay coil energized, the L—2 relay contacts (Fig. 7a) are open and provide the customary control to prevent repetition of reset as explained in the above mentioned Daly patent.

What we claim is:

1. In a record controlled accounting machine including means to handle a succession of records, means to sense factor data on each record, receiving means controlled by said sensing means for receiving two factors, multiplying means for effecting a multiplication, a product accumulator for accumulating a product under control of said multiplying means, means for causing said multiplying means to effect a multiplication under control of said receiving means, and including in combination, supplemental receiving means for receiving said factors in reversed relation to the multiplying means, means for causing said multiplying means to effect a second multiplication of the same factors under control of said supplemental receiving means upon completion of the first multiplication, a second product accumulator for accumulating the recomputed product under control of said multiplying means, comparing means controlled by the two product accumulators for determining identity or lack of identity of amounts therein, and means to cause an operation of the comparing means following the second multiplication of factor data derived from a record whereby a multiplication of factor data and checking of a multiplication may be effected for each record in a single run of records through the machine.

2. In a record controlled accounting machine, including means to sense factor data on each record, receiving means controlled by said sensing means for receiving two factors, multiplying means for effecting a multiplication, a product accumulator for accumulating a product under control of said multiplying means, means for causing said multiplying means to effect a multiplication under control of said receiving means and including in combination, supplemental receiving means for receiving said factors in a reverse relation for control of the multiplying means, means for causing said multiplying means to effect a second multiplication of the same factors under control of said supplemental receiving means upon completion of the first multiplication, a second product accumulator for accumulating the recomputed product under control of said multiplying means, recording means controlled by one of the product accumulators for recording the product in a continued machine operation following multiplying operations, comparing means controlled by the two product accumulators for determining identity or lack of identity of amounts therein, means to cause an operation of the comparing means following the second multiplication of factor data derived from a record, and means controlled by said comparing means to terminate machine operations including suppression of recording by the recording means when lack of identity is determined and to allow continued machine operations including result recording by the recording means upon identity determination.

3. In a record controlled accounting machine including means to handle a succession of records, means to sense factor data on each record, receiving means controlled by said sensing means for receiving two factors, multiplying means for effecting a multiplication, a product accumulator for accumulating a product under control of said multiplying means, means for causing said multiplying means to effect a multiplication under control of said receiving means, and including in combination, supplemental receiving means for receiving said factors in modified relation to the multiplying means, means for causing said multiplying means to effect a second multiplication of the same factors under control of said supplemental receiving means upon completion of the first multiplication, a second product accumulator for accumulating the recomputed product under control of said multiplying means, comparing means controlled by the two product accumulators for determining identity or lack of identity of amounts therein, and means to cause an operation of the comparing means following the second multiplication of factor data derived from a record whereby a multiplication of factor data and checking of a multiplication may be effected for each record in a single run of records through the machine.

ROBERT BLAKELY.
ARTHUR H. DICKINSON.